Nov. 17, 1970  H. N. HICKS, JR., ET AL  3,541,169
NAPHTHALENE HYDROGENATION
Filed Jan. 9, 1968
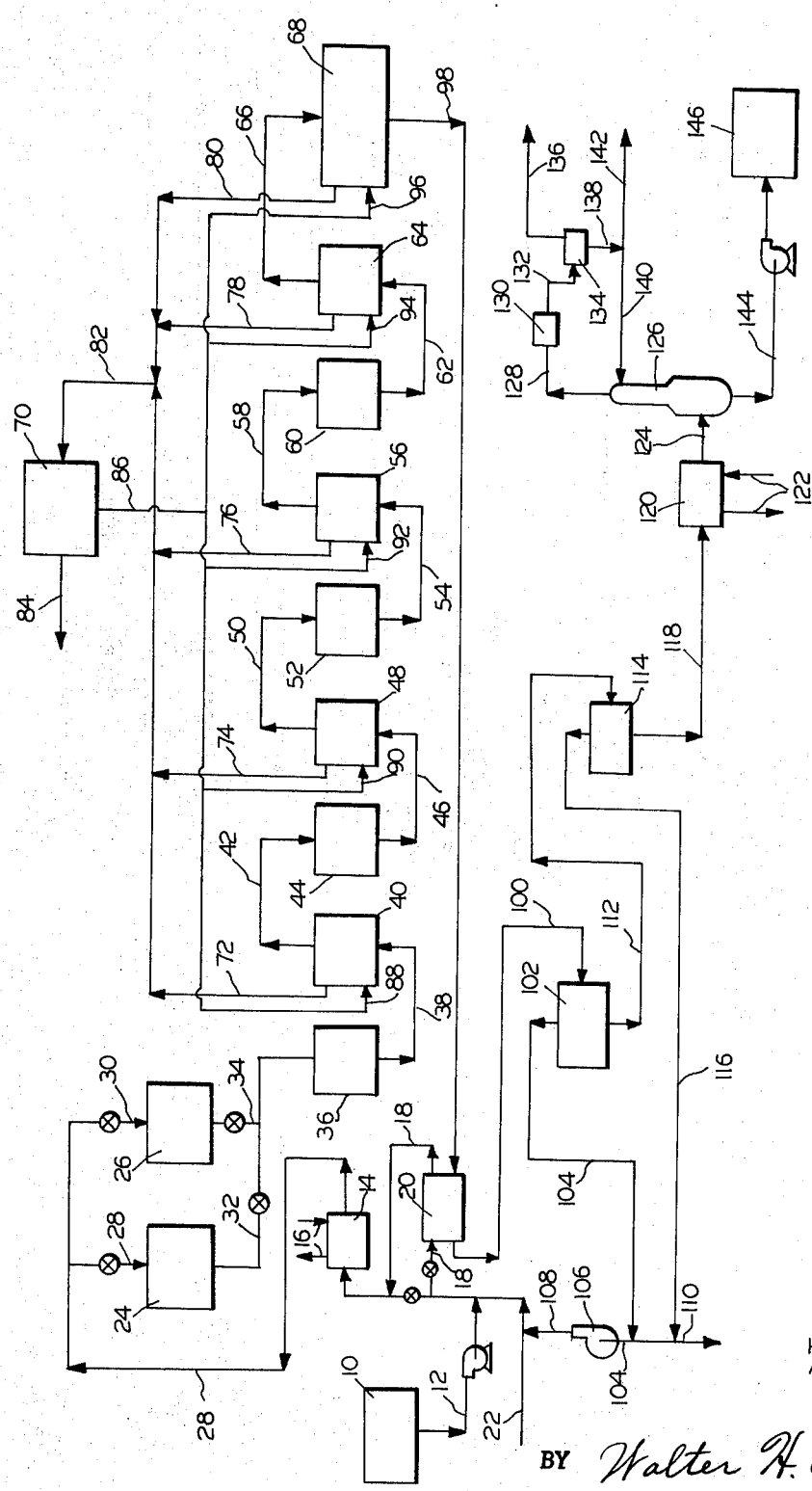
INVENTORS
HAROLD N. HICKS, JR.
ANDREW E. HAILE
BY *Walter H. Schneider*
ATTORNEY

United States Patent Office 3,541,169
Patented Nov. 17, 1970

3,541,169
NAPHTHALENE HYDROGENATION
Harold N. Hicks, Jr., Huntington, W. Va., and Andrew E. Haile, Ashland, Ky., assignors to Ashland Oil & Refining Company, Houston, Tex., a corporation of Kentucky
Filed Jan. 9, 1968, Ser. No. 696,649
Int. Cl. C07c 5/10
U.S. Cl. 260—667
13 Claims

ABSTRACT OF THE DISCLOSURE

A process for selectively hydrogenating naphthalene to substantial quantities of high purity Tetraline which includes: mixing a naphthalene feed material, preferably the naphthalene product of a hydrodealkylation reaction, with hydrogen at a hydrogen-to-hydrocarbon ratio adapted to maintain vapor phase conditions at the hereinafter-mentioned steps, preferably between about 6 and 25 to 1; preheating the mixture to a temperature sufficient to vaporize the naphthalene feed, preferably between about 375° and 450° F; passing the mixture through a chemisorptive solid material, preferably copper oxide deposited on an inert carrier in an amount of about 10 to 20%, for example about 20%, to remove sulfur contaminants from the feed mixture, passing the clarified feed mixture through a plurality of adiabatic catalytic reactors, for example between 4 and 7, each followed by a separate cooling unit, without intermediate separation of the products, under conditions to maintain a pressure of about 20 to 100 p.s.i.g., a nominal reactor temperature of about 400–550° F., a weight hourly space velocity of about 0.5 to 2.5, and a temperature rise through any one of said reactors not exceeding between about 50° and 100° F., and while maintaining in the catalytic reactors a sulfur-sensitive hydrogenation catalyst, preferably nickel oxide, in an amount of about 0.5 to 25% by weight, and preferably 10%, on an inert support; said conditions of hydrogenation and operation of said adiabatic reactors also being selected to convert a major portion of the naphthalene feed, preferably at least 80% of the naphthalene, to Tetralin; passing the product from the last cooling unit to an isothermally operated catalytic hydrogenation reactor, preferably containing the same catalyst as the adiabatic reactors; separating unreacted hydrogen from the product of the isothermal reaction, preferably recycling the hydrogen to the feed, and stabilizing the liquid product to remove about 5% thereof as an overhead and recover a bottoms product comprising Tetralin of high purity.

SUMMARY OF THE PRIOR ART

Tetralin without the concomitant production of Decalin, pleasant smelling liquid which is non-poisonous, non-explosive, and practically non-inflammable. In fact, experiments have shown that even with a considerable internal dosage, only slight toxic symptoms are observed. It is an excellent solvent and thinner, particularly for paints, varnishes and the like since it will leave no residue upon evaporation, thus causing no discoloration, even with white lacquers. In addition, Tetralin has an almost unbelievable variety of uses. For example, it may serve as a solvent for waxes, resins, rubber, gums, oils, resinates, cellulose ethers, asphalt, linoxyn, liquid driers, metallic soaps, greases, benzene, toluene, naphthalene, casinghead gasoline and other products. It is also useful in removing printing ink from paper and as a substitute for turpentine. It can also be used for purifying coal gas, for extracting sulfur from spent oxides in gas purification, and as a component of paints, varnishes, bituminous emulsions, waterproofing compositions, motor fuels, paint and varnish removers in textile processing, in agricultural sprays, in shoe and floor polishes, etc. It also has use in extracting casinghead gasoline from natural gas, in extracting liquids from normally solid carbonaceous materials, such as coal, and many other allied uses.

In spite of the value and many uses of Tetralin, there are presently only limited commercial supplies of this material. There are several reasons for such limited production.

While the classic process for the production of Tetralin is the hydrogenation of naphthalene in the presence of a catalyst at about 300° F., such production is an expensive and complex proposition. One of the major problems involved is the catalyst system. Since most naphthalene streams contain small amounts of contaminants, particularly sulfur, one major problem in the production of Tetralin by the hydrogenation of naphthalene is the catalyst system. Most conventional hydrogenation catalysts are sulfur-sensitive and thus have an extremely short life while operating on available naphthalene streams. Further, it is most difficult in these systems to produce high purity Tetralin without the concomitant production of Decalin, and the consequent requirement of very precise fractionation to separate the two. Previous investigators have studied numerous catalytic systems for the production of Tetralin. However, all of these efforts have eventually reached the selectivity-catalyst life impasse. For example, numerous patents claim the production of about 80% Tetralin and 20% Decalin and good catalyst life, but none disclose a process which appears to be capable of producing substantially pure Tetralin with only minor percentages of Decalin or unconverted naphthalene. Another alternate is, of course, the use of sulfur-resistant catalysts, but there are more expensive and none are known which are selective to Tetralin.

The majority of the prior art systems have also suffered the disadvantages of operating as a liquid system rather than in the vapor phase. The many advantages of operating any reaction in the vapor state as opposed to the liquid state are well known.

Further, with one known exception, all of the prior art techniques are incapable of operating to obtain high yields of Tetralin in a single pass system. This one exception is a liquid phase, sodium catalyzed technique presently practiced on a commercial scale. This technique treats a coal tar naphthalene with a quinoline-promoted sodium catalyst at an operating pressure of about 1000 to 3000 p.s.i.g. However, this process suffers from a relatively poor yield (about 90%) based on the naphthalene feed. Further, direct and indirect operating costs are extremely high due to the high cost of the catalyst and the high investment associated with the high operating pressures and the large reactor volumes required.

The major advantage of the sodium-catalyzed naphthalene hydrogenation process lies in the ability of this process to use a relatively impure naphthalene feed. For example, coal tar naphthalene, as opposed to petroleum naphthalene, may be utilized. As a result, this is generally the sole source of Tetralin. In addition, production of phthalic anhydride is growing at such a rate that it requires substantially the whole of the petroleum naphthalene production ans, for economic reasons, increasing quantities of coal tar naphthalene. This composition, from phthalic anhydride manufacture, is further complicated by the supply of coal tar naphthalene continuously decreasing. The latter is due largely to improvements in blast furnace operation and the consequent decline in metallurgical coke requirements. The net result is that coal tar naphthalenes are continuing to decrease in spite of an increasing demand. In addition, processes for producing coal tar naphthalene are still relatively inefficient and do not recover high percentages of naphthalene. The sum and substance of all these factors is that there is a

SUMMARY OF THE INVENTION

It is therefore an object of the present invention to provide an improved process for the hydrogenation of aromatics which overcomes the problems enumerated above. A further object of the present invention is to provide an improved process for the hydrogenation of naphthalene. Yet another object of the present invention is to provide an improved process for the selective hydrogenation of naphthalene to Tetralin. Another object of the present invention is to provide an impreved process for the production of Tetralin in carbon steel equipment. A further object of the present invention is to provide an improved process for the production of Tetralin in high yields. Yet another object of the present invention is to provide an improved process for the production of Tetralin in the presence of a low-cost, commercially available catalyst. Another and further object of the present invention is to provide an improved process for the production of Tetralin in which catalyst life is lengthened. Another and further object of the present invention is to provide an improved process for the production of Tetralin in which the selectivity of the catalyst for Tetralin is maintained extremely high. Another and further object of the present invention is to provide an improved process for the production of Tetralin wherein the feed materials are pretreated to remove contaminants. Yet another object of the present invention is to provide an improved process for the production of Tetralin wherein an improved adsorbent for feed contaminants is utilized. Another and further object of the present invention is to provide an improved process for the production of Tetralin which utilizes a single-pass reactor system. A still further object of the present invention is to provide an improved process for the production of Tetralin which utilizes a single-pass adiabatic reactor system with no intermediate fractionation. Another and further object of the present invention is to provide an improved process for the production of Tetralin wherein the reaction is carried out to a predetermined degree of conversion in an aditbatic reactor system and thereafter, is carired to substantially complete conversion in an isothermal reactor. Another object of the present invention is to provide an improved system for the production of Tetralin wherein relatively low temperatures are employed. Yet another object of the present invention is to provide an improved process for the vapor phase reaction of hydrogen and naphthalene to produce Tetralin. A still further object of the present invention is to provide an improved process for the production of Tetralin wherein plug flow is maintained through the reaction system.

Briefly in accordance with the present invention, it has been found that naphthalene can be selectively converted to substantial quantities of Tetralin by hydrogenating the naphthalene in a plurality of serially connected reaction zones at least one of the reaction zones being operated under adiabatic conditions and at least one of the other reaction zones being operated under isothermal conditions. It has also been found that maintaining a vapor phase throughout the reaction and maintaining a temperature below about 550° F. contributes greatly to the selectivity of the reaction and the catalyst life. Further, it has been found that sulfur-sensitive hydrogenation catalyst may be utilized in the reaction by first passing the feed material through a body of a particulate material comprising, copper oxide deposited on a solid inert support.

A better understanding of the present invention will be obtained from the following detailed description of the preferred embodiment when read in conjunction with the single sheet of drawings, which drawing is a flow diagram of the preferred system of the present invention.

In accordance with the figure of the drawings, the naphthalene feed is preferably obtained by hydrodealkylation of desulfurized, dicyclic concentrates, as from hydrodealkylation unit 10. The naphthalene is passed through line 12 to preheater 14. Preheater 14 may take a variety of forms, including indirect heating with hot oil, as by passing hot oil through line 16. In addition to or in place of preheater 14, the feed may be preheated by indirect exchange with the product of the system by passing the feed through line 20 and thence back to line 12. Hydrogen feed is introduce to the system through line 22. The preheated reactants are passed through one of two downflow, chemisorption guard cases, 24 or 26 by way of lines 28 and 30, respectively. As pointed out elsewhere, these guard cases serve to remove catalytic poisons from the feed. The clarified feed is discharged from guard cases 24 or 26 through lines 32 or 34, respectively. The guard cases may, of course, be switched for regeneration when breakthrough of the heteroatoms which are to be removed by the guard cases occurs. Such breakthrough is generally evidenced by a rapid decline in the temperature rise across reactor 36. Reactor 36 is the first of a series of fixed-bed adiabatic, catalytic hydrogenation units. The product of the first adiabatic reactor 36 is discharged through line 38 to a cooler 40. The product of cooler 40 has had the heat of reaction from reactor 36 essentially removed so that the feed to adiabatic reactor 38 will be the same temperature as that to the previous reactor 36. Product from cooler 40 is discharged through line 42 to a second fixed-bed hydrogenation reactor 44. The product of hydrogenation reactor 44 is likewise discharged through line 46 to cooler 48 where it is cooled and discharged through line 50 to a third hydrogenation reactor 52. From hydrogenation reactor 52, the product is discharged through line 54 to cooler 56. From cooler 56 product passes through line 58 to fourth catalytic reactor 60. The product of reactor 60 passes through line 62 to cooler 64 and then thrugh line 66 to a fifth catalytic reactor 68. Catalytic reactor 68 is operated as an isothermal unit and is preferably of tube and shell construction with the catalyst in the tubes and a boiling liquid in the shell. As shown in the drawing, coolers 40, 48, 56 and 64 and the shell of the isothermal reactor 68 may be connected in parallel with a larger heat exchange 70. Thus, the coolers 40, 48, 56 and 64 and shell 68 would be used to generate vapors of Dowtherm or other cooling material which would be discharged through lines 72, 74, 76, 78 and 80, respectively, and finally passed through line 82 to exchange 70. Exchanger 70 can best operate as a steam generator. The steam would be discharged through line 84 for other use while the condensed cooling liquid or Dowtherm condensate would be discharged through line 86 and fed back to the coolers through lines 88 90, 92, 94 and 96, respectively. Many other exchanger systems could accomplish the same result without deviating from the intended purpose of the present invention, which is to maintain the average reactor temperature at values which enhance reaction selectivity to Tetralin, while at the same time converting the heat of hydrogenation to useful energy (steam) in a highly efficient and inexpensive system. The product of isothermal reactor 68 is discharged through line 98 and preferably passes, in indirect heat exchange, through heat exchanger 18 to preheat the feed. From the heat exchanger the product passes through line 100 to a high-pressure flash unit or separator 102. In separator 102, unreacted hydrogen is separated and recycled through line 104, recycle compressor 106, and line 108 to hydrogen feed line 22. A slip stream of the recycle hydrogen or all of the same may be purged through line 110 to a unit, not shown, for the removal of hydrocarbon gases. The liquid fraction from separator 102 is discharged through line 112 to a low-pressure flash unit or separator 114. Hydrogen separated from the product in separator 114 is discharged through line 116 for recycle and/or purge as previously pointed out. The liquid product from separator 114 is, in turn, discharged through line 118 to a product stabilization system. The product in line 118 is first heated in a preheater 120, supplied with hot oil or other heating material through line 122. The heated material is passed through line 124 to stabilizer 126. In product stabilizer 126, dissolved hydrogen and other light gases, small amounts of benzene and cyclohexane formed in the reactors by hydrocracking, and small amounts of Decalin which are removed through line 128, through a condenser 130, line 132 and accumulator 134. From accumulator 134, gases are discharged for use as fuel or the like through line 136. Light liquids are discharge through line 138 from whence all or a part thereof may be recycled to the stabilizer through line 140 or discharged through line 142. Stabilizer bottoms, comprising Tetralin of 95% or higher purity is discharged through line 144 to Tetralin storage unit 146. The major contaminants of the Tetralin include naphthalene and Decalin.

As shown in the drawing, the preferred source of naphthalene, in accordance with the present invention, is the naphthalene product of a hydrodealkylation unit. The hydrodealkylation unit may be operated on a variety of feed materials from any source of carbonaceous material, including, coal, petroleum, etc. For example, coke oven or coal tar oils derived from carbonization of coal, liquids, extracted from coal by solvent extraction with Tetralin, Decalin, etc., and liquids obtained by combinations of solvent extraction and carbonization may be utilized. The feed material to the hydrodealkylation unit may also be a process stream from a petroleum or coal refinery such as catalytic reformate, obtained by contacting petroleum or coal liquids with a precious metal catalyst, such as platinum, at a temperature of about 900–950° F., a pressure of about 200 to 600 p.s.i.g., a weight hourly space velocity between about 1.5 and 5 and a hydrogen-to-hydrocarbon ratio between about 3 to 1 and 10 to 1. A higher-boiling reformate fraction, boiling between about 400–600° F. is preferred. Still another feed for the hydrodealkylation reaction may include a reformer product, boiling between about 400–600° F., which has been subjected to solvent extraction such as by the "UDEX" process (triethylene glycol and water). Other petroleum fractions which may be used as feed materials include kerosene, which has been extracted with an aromatic selective solvent, such as sulfur dioxide, a catalytic cracked light cycle oil which has been subjected to solvent extraction, as with sulfur dioxide, or a catalytic cracked light cycle oil which has been subjected to hydroocracking. The hydrodealkylation unit is preferably a catalytic unit, for example utilizing a catalyst containing 10 to 15% chromia on gamma alumina. A highly effective catalyst of this type is designated G–41 by its manufacturer, the Girdler Construction Company, Louisville, Ky. By utilizing such a catalyst, the hydrodealkylation may be carried out at temperatures between about 1000 and 1400° F., and preferably between 1200–1400° F.; at a weight hourly space velocity between about 0.5 and 5, and preferably between 0.5 and 3; and at a hydrogen-to-hydrocarbon ratio between about 2 to 1 and 30 to 1, and preferably between 10 to 1 and 20 to 1. It is possible to carry out the hydrodealkylation without a catalyst, in which case the temperature is maintained above about 1200° F., the pressure above about 500 p.s.i.g., and the hydrogen-to-hydrocarbon ration between about 14,000 and 19,000 cubic feet of hydrogen per barrel of feed.

In a hydrodealkylation unit, the feed is desulfurized to a certain extent and monocyclic and polycyclic aromatics dealkylated to produce valuable benzene, toluene, xylenes and naphthalene. The product of the hydrodealkylation unit includes a normally gaseous material and a normally liquid material. The residual light gases are drawn off and used as a plant fuel. The liquid fraction is then separated into a dealkylated fraction containing benzene, toluene, xylenes and/or naphthalene and a higher boiling product or bottoms product normally utilized as a fuel oil stock. The cut point between the dealkylated liquid fraction and the bottoms fraction depends upon the type of feed and the dealkylated product to be recovered. Where naphthalene is the primary end product, the cut point should be about 400–600° F., and ideally between 440 and 525° F. The naphthalene product from the hydrodealkylation unit is preferably pumped to the preheater system at a temperature of about 250° F.

Hydrogen for the operation may be obtained from any one of a variety of refinery streams. For example, the hydrogen feed may be derived as an off-gas from the hydrodealkylation unit or it may be obtained as an off-gas from a reformer unit or the like. Whether derived from coal refinery streams or petroleum refinery streams, the hydrogen will normally contain extremely small amounts of sulfur contaminants. As will be pointed out hereinafter in greater detail, it is necessary in the present process that the materials contacted by the hydrogenation catalyst be substantially free of such sulfur contaminants. Accordingly, the hydrogen, containing small amounts of contaminating sulfur, may be mixed with the hydrodealkylation feed, which also contains small amounts of contaminating sulfur, and then desulfurized as hereinafter pointed out; or, preferably, the hydrogen feed is caustic scrubbed before mixing with the feed. In any event, the hydrogen feed, at a temperature of about 200° F., is passed to the preheater along with the hydrodealkylation product.

It has been found in accordance with the present invention that hydrogen-to-hydrocarbon ratios may vary quite widely without serious ultimate effect on the operation. Specifically, the hydrogen-to-hydrocarbon mole ratio may vary anywhere between about 6 and 25 to 1. However, if the hydrogen-to-hydrocarbon ratio falls below prudent limits, the reduced amount of hydrogen will decrease the partial pressure of hydrogen and, as pointed out hereinafter, decrease in pressure below desired limits will eventually result in mixed phase operation. Ultimately the selectivity of the catalyst for Tetralin production will be effected.

The preheating of the feed or, ultimately, the temperature at which hydrogenation is carried out, has a rather profound effect upon the present process and to a great extent dictates the manner in which the process is operated. Specifically, it has been determined that the reaction should be carried out while maintaining a vapor phase at all times. If vapor phase operations are not carried out, it has been found that there is a tendency to produce Decalin rather than Tetralin and there is the further tendency to lay down coke and polymers on the catalyst. Hence, the feed material should be preheated to a temperature of about 375 to 450° F., and preferably the upper temperature. By varying this preheating temperature within the range indicated, some flexibility in throughput can be built into the system depending, of course, upon the hydrogen-to-hydrocarbon ratio. On the other hand, it has also been found that excessive temperatures are detrimental to the selectivity and activity of the hydrogenation catalyst. These phase and temperature characteristics of the hydrogenation of naphthalene dictate, to a certain extent, the novel reactor system utilized in the present invention. The details of the novel reactor system and the temperature distribution therethrough will be discussed hereinafter.

The naphthalene feed, utilized in accordance with the present invention, will normally contain from about 1 to 50 p.p.m. of sulfur. Since the present process utilizes a sulfur-sensitive catalyst, as discussed later, it is necessary that this small amount of sulfur be removed from the feed prior to the hydrogenation reaction. In accordance with the present invention, a wide variety of materials were tested for the removal of sulfur from the feed material. It was determined that the best procedure was to utilize a chemisorptive material in a guard case located in advance of the first catalyst unit. It was further determined that this guard case material should have no hydrogenation activity of its own; that it should have a high surface area; that it should have a high metal content and therefore a long life; that it should preferably be reducible, for regenerative purposes, at the same temperature as the hydrogenation catalyst is pretreated; and that it should be effective under conditions substantially the same as those utilized in the hydrogenation reaction itself. Among the materials found effective for pretreatment of the feed materials were iron in the form of powder or as iron filings, or on a suitable high surface area support. While the iron proved effective in the removal of sulfur from the feed, the temperature required to reduce the iron was considerably above that required for the hydrogenation step. It was also found that pre-reduced nickel on a suitable support was effective for the removal of contaminants from the feed. However, the pre-reduced nickel deposited on a suitable high surface area support has a tendency to abrade and be carried over into the catalyst units as fines. This abrasion, of course, causes a loss of the pretreating agent and thus, a loss in its activity for its intended purpose. The carry-over of reduced nickel also results in rapid selectivity deterioration as evidenced by substantial increases in Decalin production. A material found most outstanding for the removal of contaminating sulfur from naphthalene is copper oxide deposited on a high surface area support. More specifically, the pretreating agent should contain about 10 to 20% of copper oxide on a suitable inert support. A material of this character, containing 20% copper oxide, is designated Cu-0803T by its manufacturer, the Harshaw Chemical Company of Cleveland, Ohio. The following table shows the effectiveness of the copper oxide as a material for the removal of contaminating sulfur from the naphthalene feed.

In all of the runs hereinafter reported, the factor $K_1$ represents the hydrogenation catalyst activity and the factor $K_1/K_2$ represents the selectivity of the catalyst to Tetralin production. These factors can be calculated from the measured values of the experiments by assuming a first order reaction represented by $A \rightarrow B \rightarrow C$, where A is naphthalene, B is Tetralin and C is Decalin; that the hydrogen concentrations are so high that little change takes place across the reactor and that "plug" flow in a substantially vapor phase occurs (no mixing and back flow). Under these conditions the following reaction rate expressions are valid:

$$\frac{dc_N}{dt} = -K_1 \pi C_N \quad (1)$$

$$\frac{dc_T}{dt} = K_1 \pi C_N - K_2 \pi C_T \quad (2)$$

Where:

$C_N$=Naphthalene mole fraction (hydrogen free basis)
$C_T$=Tetralin mole fraction (hydrogen free basis)
$t$=Time, seconds
$\pi$=Hydrogen pressure, atmospheres
$K_1$, $K_2$=Rate constants Equations 1 and 2 can be integrated to yield:

$$\ln \frac{C_{NO}}{C_N} = K_1 \pi \tau \quad (3)$$

$$C_T = \frac{K_1}{K_1 - K_2} \left[ C_{NO}^{K_2/K_1} - C_N \right] \quad (4)$$

where:

$C_{NO}$ is naphthalene in,
$C_N$ is naphthalene out,
$\tau$ is residence time, seconds,
$C_T = 0$, and
$C_{NO} = 1.0$ $$\tau = \frac{\text{Reactor volume}}{\text{Volumetric flow rate (at reactor conditions)}} \quad (5)$$

The final item needed to calculate the experimental rate constants is the hydrogen partial pressure. It is convenient to assume that this quantity is constant across the reactor by using an average reactor pressure.

Having $\tau$ and $\pi$ and the product composition permits calculation of the experimental rate constants from Equations 3 and 4. $K_1$ can, of course, be calculated directly from Equation 3 and $K_2$ is obtained by trial-and-error solution of Equation 4.

By way of illustration, at 99.5% conversion, a value of $K_1/K_2$ of 25 will indicate a product of 0.005 (mol fraction) naphthalene, 0.838 Tetralin and 0.157 Decalin; of 250, 0.005 naphthalene, 0.978 Tetralin and .017 Decalin; and of 2500, 0.005 naphthalene, 0.993 Tetralin and 0.002 Decalin.

The conditions of operation and results are set forth in the tables. Table I shows the results of tests using 20% copper oxide on an inert support as a guard case and 10% nickel oxide on an inert support. Both contact agents were in the form of ⅛" pellets and the nickel oxide was reduced with hydrogen at 600° F. prior to the tests.

TABLE I.—GUARD CASE STUDIES

| Run No. | Time from start, hrs. | WHSV | Hydrogen partial pressure, p.s.i.g. | Residence time, sec. | Temperature, °F. | $K^1$, sec.$^{-1}$ | $K^1/K^2$ | Wt. percent | | |
|---|---|---|---|---|---|---|---|---|---|---|
| | | | | | | | | Decalin | Tetralin | Naphthalene |
| 1 | | 2.3 | 56 | 2.0 | 465 | 1.4 | >500 | Tr | 94.0 | 6.0 |
| | | 1.9 | 94 | 3.0 | 465 | 1.3 | 125 | 2.2 | 95.4 | 2.2 |
| | | 1.0 | 100 | 3.2 | 465 | 1.2 | 125 | 2.4 | 95.6 | 2.0 |
| | | 1.2 | 49 | 2.5 | 465 | 1.0 | 5.00 | 0.2 | 90.5 | 9.3 |
| | | 1.3 | 49 | 2.5 | 465 | 1.0 | 500 | 0.2 | 90.3 | 9.5 |
| 2 | | 2.0 | 64 | 3.6 | 475 | 0.2 | | | 47.3 | 52.7 |
| | | 2.0 | 64 | 3.0 | 475 | 1.3 | 45 | 6.5 | 90.7 | 1.8 |
| 3 | | 2.0 | 64 | 3.5 | 475 | 1.0 | 36 | 6.9 | 90.0 | 3.1 |
| | | 2.3 | 77 | 2.0 | 475 | 1.9 | 33 | 8.9 | 88.7 | 2.4 |
| 4 | | 1.9 | 55 | 2.1 | 455 | 1.6 | 770 | 0.3 | 96.0 | 3.7 |
| | | 2.0 | 37 | 1.4 | 458 | 1.4 | >2,000 | Tr | 85.7 | 14.3 |
| | | 2.0 | 37 | 1.4 | 435 | 1.7 | >2,000 | T | 91.6 | 8.4 |
| 5 | 6 | 1.7 | 57 | 2.3 | 455 | 1.7 | ,90 | | | |
| | 12 | 2.0 | 57 | 2.4 | 475 | 1.2 | 200 | | | |
| | 20 | 2.0 | 60 | 2.3 | 455 | 1.5 | 300 | | | |
| | 120 | 2.0 | 60 | 2.3 | 425 | 1.5 | 400 | *0.8 | *96.1 | *3.1 |
| 6 | 60 | 2.0 | 70 | 2.0 | 455 | 1.0 | 330 | | | |
| | 65 | 4.0 | 70 | 2.5 | 428 | 0.7 | 300 | | | |

*At 100 hrs.

The first, fourth and sixth tests, set out in Table I above, show the copper oxide guard performed well over short test periods. In the fifth test, the conversion remained constant at 96 to 97% Tetralin at 100 hours. The test was terminated voluntarily at 120 hours. The sixth test was also conducted in a slightly larger reactor than that of test 5, and it is apparent that the results confirm the prior test. Tests 1 through 4 and 6 show temperatures at a point outside the reactor and as a result the internal reactor temperatures were slightly higher.

By contrast to these results, similar tests were conducted using the same hydrogenation catalyst and at a weight hourly space velocity (WHSV) of 2, a temperature of 460 to 470° F. and a pressure of 60 p.s.i.g. However, no guard case was used. In a first test the unit was run with pure hydrogen for about eight hours and then with hydrogen containing small amounts of sulfur. The Tetralin percentage in the product decreased suddenly. In several other tests in another reactor, the catalyst was poisoned in about four hours (sharp decline in Tetralin production) even though pure hydrogen was used.

The treatment of the feed with the copper oxide should, of course, remove the contaminating sulfur at the operating conditions existent at the entrance to the first reactor chamber. Specifically, the naphthalene feed passes through the copper oxide guard case at a temperature at about 375 to 450° F., and preferably at a pressure of about 20 to 100 p.s.i.g. The effects of pressure in the present process will be discussed in greater detail when reference is made to the operation of the hydrogenation system.

One of the major advantages of the present invention is that it makes possible the use of a readily-available, inexpensive hydrogenation catalyst with no sacrifice of catalyst life, catalyst activity or selectivity for the production of Tetralin. As a matter of fact, as is pointed out hereinafter, the life, activity, and selectivity of the catalyst in the present process is vastly superior to anything heretofore suggested in the prior art. Obviously, the least expensive catalyst will be a known hydrogenation catalyst which is sulfur-sensitive but which could not have heretofore been used on sulfur contaminated feeds. However, by the use of the guard case in the present invention, it is possible to utilize such sulfur-sensitive catalysts. An ideal catalyst in accordance with the present invention was found to be nickel oxide deposited on a high surface area, inert carrier.

However, it has been found, in accordance with the present invention, that nickel oxide catalysts cannot be indiscriminately utilized even in the present invention. For example, it has been found that as the nickel content of the catalyst increases, the activity of the catalyst increases but its selectivity to the production of Tetralin decreases. Accordingly, one is faced with the activity-selectivity dilemma, even with a conventional nickel oxide catalyst. It has been found in accordance with the present invention that the catalyst should contain between about 0.5 and 25% nickel oxide for best results. The most desirable catalyst is one containing about 10% nickel, since it has been found that such a catalyst has approximately the same activity-selectivity properties as one containing about 3.5% nickel and the higher concentration will, of course, permit longer catalyst life. A highly effective catalyst in accordance with the present invention is one designated Ni-$O_3O_1$T by its manufacturer, the Harshaw Chemical Company of Cleveland, Ohio. This particular catalyst can be regenerated by calcination in air at a temperature of about 1100° F.

The previous Table I set forth some catalyst life data and the following tables include additional catalyst life data and data on the activity and selectivity of catalysts containing between about 0.5 and 25% of nickel oxide. In each test of Table II, a 600° F.-8 hour reduction period was used on the hydrogenation catalyst. A copper oxide guard case was used at nominal operating conditions of 40 p.s.i.g., a WHSV of 1.5 to 2.0 and a $H_2$/HC ratio of 8/1. Quinolin was added to the feed, where indicated in Run 3, as a promoter for the reaction. The data of Table III, below, were obtained with a copper oxide guard case and a nickel oxide catalyst, as previously noted, at a temperature of about 440° F., except as noted.

TABLE II

| Run | Nickel content, percent | WHSV | Hydrogen partial pressure, p.s.i. | Residence time, sec. | Shell temperature, °F. | $K_1$, sec.$^{-1}$ | $K_1/K_2$ | wt. percent Decalin | Tetralin | Naphthalene |
|---|---|---|---|---|---|---|---|---|---|---|
| 1 | 25 | 1.7 | 56 | 1.9 | 455 | 1.9 | 85 | 3.0 | 94.2 | 2.8 |
|   |    | 1.6 | 57 | 1.6 | 475 | 1.8 | 100 | 2.2 | 92.6 | 5.2 |
|   |    | 1.6 | 57 | 1.5 | 495 | 1.6 | 140 | 1.2 | 90.3 | 8.5 |
| 2 | 15 | 1.6 | 53 | 1.7 | 455 | 1.9 | 154 | 1.6 | 94.8 | 3.6 |
|   |    | 1.8 | 54 | 1.6 | 475 | 1.7 | 333 | 0.5 | 93.2 | 6.3 |
|   |    | 1.4 | 55 | 1.7 | 495 | 1.3 | 165 | 0.5 | 89.4 | 10.1 |
|   |    | 1.9 | 55 | 2.1 | 455 | 1.6 | 770 | 0.3 | 96.0 | 3.7 |
|   |    | 2.0 | 37 | 1.4 | 458 | 1.4 | >2,000 | 0.0 | 85.7 | 14.3 |
| 3 | 10 | 2.0 | 37 | 1.4 | 435 | 1.7 | >2,000 | Tr. | 91.6 | 8.4 |
|   |    | 1.7 | 37 | 1.3 | 433 | 1.7 | 2,000 | 0.1 | 91.3 | 8.6 |
|   |    | 3.7 | 34 | 1.5 | 432 | 0.6 |  | 0.0 | 61.2 | 38.8 |
|   |    | 2.0 | 55 | 2.3 | 455 | 1.5 | 333 | 0.7 | 96.0 | 3.2 |
| 4 | 3.6 | 1.8 | 56 | 2.3 | 475 | 1.2 | 500 | 0.2 | 94.1 | 5.6 |
|   |    | 2.0 | 54 | 2.3 | 495 | 0.9 |  | Tr. | 87.4 | 12.6 |
|   |    | 1.8 | 55 | 1.8 | 455 | 0.7 |  | Tr. | 73.9 | 26.1 |
| 5 | 0.5 | 1.9 | 55 | 1.8 | 475 | 0.6 |  | Tr. | 66.4 | 33.8 |
|   |    | 1.7 | 54 | 1.8 | 495 | 0.5 |  | Tr. | 61.9 | 38.1 |

TABLE III

| Date | Cumulative [1] lbs. feed | $H_2$ rate s.c.f.h. | Outlet pressure, p.s.i.g. | Residence time, sec. | WHSV | $H_2$/HC | $K_1$, sec.$^{-1}$ | <D | D | D-T | T | N |
|---|---|---|---|---|---|---|---|---|---|---|---|---|
| 6-9 | 35 | 400 | 75 | 1.8 | 2.5 | 12.6 | 2.22 | 0.9 | 1.8 | 0.4 | 95.2 | 1.7 |
| 6-13 | 200 | 400 | 80 | 1.8 | 2.5 | 12.6 | 2.22 | 0.6 | 1.7 | 0.4 | 95.3 | 1.7 |
| 6-14 | 300 | 400 | 80 | 1.8 | 2.5 | 12.6 | 2.22 | 0.5 | 1.7 | 0.5 | 95.5 | 1.8 |
| 6-14 | 400 | 400 | 60 | 1.5 | 2.5 | 12.6 | 2.33 | 0.5 | 1.0 | 0.2 | 95.4 | 4.9 |
| 6-15 | 600 | 400 | 70 | 1.5 | 2.5 | 12.6 | 2.26 | 0.5 | 0.7 | 0.4 | 95.2 | 3.2 |
| 6-16 | 800 | 400 | 65 | 1.5 | 2.5 | 12.6 | 2.26 | 0.3 | 0.6 | 0.2 | 95.5 | 3.4 |
| 6-19 | 1,700 | 400 | 65 | 1.5 | 2.5 | 12.6 | 2.14 | 0.4 | 0.4 | 0.2 | 94.8 | 4.2 |
| 6-20 | 2,000 | 400 | 67 | 1.5 | 2.5 | 12.6 | 2.07 | 0.3 | 0.4 | 0.2 | 94.7 | 4.4 |
| 6-21 | 2,300 | 400 | 67 | 1.5 | 2.5 | 12.6 | 2.00 | 0.4 | 0.4 | 0.2 | 94.1 | 4.9 |
| 6-22 | 2,500 | 400 | 65 | 1.5 | 2.5 | 12.6 | 1.93 | 0.4 | 0.4 | 0.2 | 93.6 | 5.4 |
| 6-23 | 2,800 | 400 | 118 | 2.5 | 2.5 | 12.6 | 1.88 | 0.8 | 2.3 | 0.6 | 95.3 | 0.9 |
| 6-27 | 3,300 | 400 | 100 | 2.2 | 2.5 | 12.6 | 1.91 | 0.8 | 1.5 | 0.4 | 95.8 | 1.5 |
| 6-28 | 3,600 | 275 | 100 | 3.1 | 2.5 | 8.7 | 1.20 | 0.4 | 0.7 | 0.3 | 95.7 | 2.7 |
| 6-28 | 3,700 | 200 | 100 | 4.5 | 2.7 | 6.3 | 0.70 | 0.9 | 0.7 | 0.5 | 93.8 | 4.1 |
| 6-29 | 3,800 | 400 | 100 | 2.2 | 2.5 | 12.6 | 1.70 | 0.6 | 0.9 | 1.2 | 94.8 | 2.4 |
| 6-30 | 4,100 | 400 | 100 | 2.2 | 3.3 | 9.2 | 1.27 | 0.7 | 0.5 | 0.2 | 92.8 | 3.8 |
| 6-30 | 4,200 | 400 | 100 | 2.2 | 1.5 | 21.0 | 2.00 | 1.1 | 2.6 | 0.5 | 94.3 | 1.3 |
| 7-6 | 4,300 | 200 | 100 | 4.5 | 2.0 | 8.4 | 0.75 | 1.4 | 1.1 | 0.4 | 93.8 | 3.2 |
| 7-7 | 4,400 | 200 | 100 | 4.5 | 2.0 | 8.4 | 0.85 | 1.0 | 0.9 | 0.5 | 95.2 | 2.2 |
| 7-9 | 4,550 | 200 | 100 | 4.5 | 2.0 | 8.4 | 0.85 | 1.7 | 1.3 | 0.6 | 94.1 | 3.2 |
| 7-11 | 4,700 | 200 | 100 | 4.5 | 2.0 | 8.4 | 0.80 | 1.5 | 0.9 | 0.4 | 94.3 | 3.8 |
| 7-12 | 4,900 | 200 | 100 | 4.3 | 2.0 | 8.4 | 0.77 | 1.4 | 0.6 | 0.3 | 93.8 | 3.8 |
| 7-13 | 5,100 | 200 | 100 | 4.3 | 2.0 | 8.4 | 0.76 | 1.4 | 0.6 | 0.3 | 93.5 | 4.1 |
| 7-14 | 5,300 | 400 | 50 | 1.2 | 2.0 | 15.4 | 1.22 | 1.2 | 0.1 |  | 74.9 | 23.8 |
| 7-18 | 5,800 | 200 | 50 | 2.1 | 2.0 | 7.7 | 0.76 | 1.0 | 0.3 |  | 78.4 | 20.3 |
| 7-19 | 6,000 | 400 | 85 | 2.1 | 2.0 | 15.4 | 1.23 | 1.5 | 0.7 | 0.2 | 90.0 | 7.6 |
| 7-20 | 6,200 | 400 | 85 | 2.1 | 2.0 | 15.4 | 1.15 | 1.4 | 0.5 | 0.1 | 89.0 | 9.0 |
| 7-21 | 6,300 | 200 | 85 | 4.2 | 1.25 | 12.6 | 0.82 | 1.5 | 0.8 | 0.3 | 94.3 | 3.3 |
| 7-22 | 6,400 | 400 | 85 | 4.2 | 1.25 | 12.6 | 0.80 | 1.5 | 0.7 | 0.3 | 93.8 | 3.7 |
| 7-23 | 6,500 | 400 | 85 | 2.1 | 1.25 | 25 | 1.64 | 1.8 | 1.1 | 0.3 | 93.4 | 3.3 |
| 7-24 [2] | 6,600 | 400 | 85 | 2.1 | 1.25 | 25 | 1.14 | 1.6 | 0.8 | 0.3 | 88.1 | 9.2 |
| 7-25 [3] | 6,700 | 400 | 85 | 2.1 | 1.25 | 25 | 0.62 | 2.2 | 1.0 | 0.9 | 68.5 | 27.4 |
| 7-26 | 6,800 | 400 | 85 | 2.1 | 1.40 | 20.5 | 1.53 | 1.5 | 1.4 | 0.3 | 92.7 | 4.1 |

[1] 4.5 lbs. catalyst charge.
[2] 480° F.
[3] 548° F.

The used catalyst of Table III was successfully regenerated by calcining in air at 1100° F. Table IV compares the regenerated catalyst with new and spent catalyst.

TABLE IV

| Catalyst | New | Spent | Regenerated |
|---|---|---|---|
| Pressure, p.s.i.g | 50 | 85 | 100 |
| Hydrogen rate, s.c.f.h | 2.0 | 2.0 | 3.5 |
| Temperature, ° F | 440 | 440 | 443 |
| WHSV | 2 | 2 | 2 |
| Feed rate, cc./hr | 60 | 60 | 60 |
| Residence time, sec | 2.1 | 2.1 | 2.5 |
| Product composition, percent: | | | |
| >Decalin | | 1.4 | |
| Decalin | 0.3 | 0.5 | 1.9 |
| Decalin to Tetralin | | 0.1 | 1.6 |
| Tetralin | 96.0 | 89 | 96.9 |
| Naphthalene | 3.7 | 9.0 | 0.6 |
| $K_1$, sec.$^{-1}$ | 1.60 | 1.15 | 2.05 |

The temperature at which the catalyst is reduced also has a bearing on the selectivity of the catalyst. Table V, below, illustrates this.

TABLE V

| Run | Catalyst reduction temp., °F. | Average reactor temp., °F. | Average reactor pressure, p.s.i.g. | Average reactor pressure drop, p.s.i.g. | $H_2$/HC inlet conditions | WHSV | Residence time, sec. | Rate constant, $K_1$, atm.$^{-1}$ hr.$^{-1}$ | Selectivity, $K_1/K_2$ |
|---|---|---|---|---|---|---|---|---|---|
| 1 | 650 | 480 | 380 | 40 | 7.0 | 1.4 | 18.7 | (¹) | (¹) |
| 2 | 650 | 475 | 60 | 30 | 7.1 | 1.9 | 2.0 | 0.40 | 260 |
| 3 | 650 | 490 | 61 | 30 | 7.3 | 2.0 | 2.2 | 0.22 | 133 |
| 4 | 650 | 530 | 55 | 60 | 7.8 | 2.0 | 2.2 | 0.12 | (²) |
| 5 | 700 | 478 | 55 | 110 | 7.8 | 1.9 | 2.4 | 0.22 | 48 |
| 6 | 700 | 494 | 58 | 105 | 7.2 | 2.0 | 2.5 | 0.12 | 31 |
| 7 | 700 | 517 | 60 | 115 | 7.8 | 2.1 | 2.5 | 0.17 | 60 |
| 8 | 650 | 463 | 55 | 95 | 8.0 | 2.4 | 1.8 | 0.36 | 310 |
| 9 | 650 | 493 | 55 | 105 | 12.5 | 1.2 | 2.0 | 0.20 | 67 |
| 10 | 650 | 518 | 55 | 90 | 8.7 | 2.1 | 1.7 | 0.20 | 77 |
| 11 | 600 | 452 | 60 | 80 | 9.5 | 1.8 | 2.0 | 0.41 | 3,300 |
| 12 | 600 | 476 | 60 | 80 | 9.6 | 1.7 | 2.0 | 0.33 | 300 |
| 13 | 600 | 492 | 60 | 80 | 9.5 | 1.7 | 2.0 | 0.29 | 250 |
| 14 | 600 | 518 | 60 | 80 | 9.9 | 1.8 | 1.7 | 0.25 | 100 |
| 15 | 500 | 453 | 50 | | | 1.7 | 2.1 | ³1.9 | 200 |
| 16 | 500 | 476 | 50 | | | 1.9 | 1.8 | ³1.8 | 500 |
| 17 | 500 | 496 | 50 | | | 1.9 | 1.8 | ³1.8 | 1,000 |

¹ Mixed Phase—product analysis—100% Decalin.
² Conversion too low to permit accurate measurement of Decalin.
³ Sec.$^{-1}$.

The catalyst is distributed exponentially throughout a series of fixed-bed hydrogenation reactors. As will be pointed out, there are preferably 5 to 8 such fixed-bed reactors connected in series and having cooling units containing Dowtherm between each successive reactors.

As previously pointed out, the hydrogenation reaction is an exothermic reaction. Further, it has been found that excessive temperatures above about 550° F. are detrimental to catalyst activity and selectivity. Finally, it has also been found that volumetric reaction rates from naphthalene to Tetralin to Decalin preclude the operation of the process as an isothermal operation throughout. More specifically, it has been found in accordance with the present invention that if the hydrogenation reaction is carried out through a series of adiabatic reactors without product separation and until a majority of the naphthalene hydrogenation has taken place, and thereafter the final portion of the naphtalene is hydrogenated in an isothermal reactor, extremely high selectivity to Tetralin can be attained. Still more specifically, it has been found that if the hydrogenation of naphthalene to Tetralin is carried to at least about 50% and preferably to about 80% completion, through a series of adiabatic reactors, the reaction rate is sufficiently low in the hydrogenation of the remaining 80-99% of naphthalene that an isothermal hydrogenation can then be carried out. Preferably, therefore, a seires of from 4 to 7 fixed beds operated adiabatically and in series is utilized in accordance with the present invention. In each of these reactors, the temperature is permitted to rise adiabatically by between 50 to 100° F. In a specific example, the feed temperature to the first adiabatic reactor would be about 450° F. and the exit temperature about 550° F. Following each adiabatic reactor is a cooler adapted to cool the product from preceding reactor to the initial feed temperature for passage to the next adiabatic reactor. This procedure is repeated through all of the adiabatic reactors. The cooling units are preferably cooling units indirectly cooled with Dowtherm or another appropriate high-boiling cooling agent. The last reactor in the series is an isothermal reactor designed to complete the hydrogenation of the naphthalene to a product containing in excess of 95% Tetralin. The product from the last adiabatic reactor, at a temperature of about 550° F. is, of course, cooled through the last cooler to the initial feed temperature, for example 450° F. It is then fed through the tubes of a tube and shell reactor, which tubes are filled with the nickel oxide supported catalyst. Circulating between the tubes and the shell of the reactor is a suitable coolant such as the Dowtherm utilized in the adiabatic coolers. By way of specific example, the product of the isothermal reactor is discharged at a temperature of about 475° F. By way of specific example, the reactor system for a 100,000,000 lb. per day Tetralin plant would include 4 diabatic reactors, comprising 2.5, 3.0, 4.0 and 7-foot lengths, respectively, of 16" diameter pipe. These four reactors would contain 250, 300, 400 and 700 pounds of catalyst each. Following each of the four adiabatic reactors, would be a cooler having from 200–300 sq. ft. of Dowtherm exchanger surface. The isothermal reactor would include about 280 two-inch tubes, 10' in length and contain 2800 pounds of catalyst.

As was also previously pointed out, it is quite critical to the present invention that the vapor phase be maintained throughout the reaction. Specifically, since naphthalene boils at about 425° F., reactor temperatures should be maintained above this value. It has been found in accordance with the present invention that if mixed liquid and vapor phases exist in the reactors, this detrimentally affects the selectivity to Tetralin. The primary factors which determine whether such vapor or mixed phase shall exist are, of course, the temperature and the system pressure. Under the temperature conditions previously pointed out, it has been found that hydrogen partial pressure throughout the system should be maintained between about 20 and 100 p.s.i.g. If the pressure at the temperatures indicated exceeds about 100 p.s.i.g., the selectivity to Tetralin decreases. Previous Table V shows the effect of reaction temperature variations and/ or variations in pressure on conversion and selectivity. As noted, Run #1 was a mixed phase reaction due to the high pressure and conversion was too low to measure in the high temperature Run #4. Runs designated 7-24 and 7-25 of previous Table III also show the effects of increasing the temperature from previous temperature of 440° F. to 480° F. and 548° F., respectively.

As indicated by the previous data and as previously indicated, the only real effect of pressure on the reaction is to change selectivity to Tetralin by changing the volicity and the rate of axial dispersion (low velocities encourage channeling and stagnant regions) and creating mixed phase conditions which result in drastic changes in residence time and reaction mechanism. To illustrate this, the following Table VI sets forth low pressure Runs 1, 2 and 3 and selected runs from previous Table III.

TABLE VI

| Test | $C_N$ in | $C_N$ out | $\bar{C}_N$ | $C_N$ | $t$. sec. | Temp., °F | Pressure, p.s.i.g. | $H_2$/HC | WHSV | $K_1$ |
|---|---|---|---|---|---|---|---|---|---|---|
| 1 | 0.214 | 0.104 | 0.159 | 0.110 | 1.62 | 450 | 25 | 7 | 2 | 0.43 |
| 2 | 0.214 | 0.044 | 0.129 | 0.170 | 3.0 | 450 | 50 | 7 | 2 | 0.44 |
| 3 | 0.214 | 0.026 | 0.120 | 0.188 | 4.15 | 450 | 75 | 7 | 2 | 0.38 |
| 4(7–14) | 1.000 | 0.238 | | | 1.3 | 440 | 50 | 15.5 | 2 | 1.13 |
| 5(7–19) | 1.000 | 0.076 | | | 2.0 | 440 | 85 | 15.5 | 2 | 1.29 |
| 6(6–22) | 1.000 | 0.054 | | | 1.6 | 440 | 65 | 12.6 | 2.5 | 1.83 |
| 7(6–23) | 1.000 | 0.009 | | | 2.7 | 440 | 118 | 12.6 | 2.5 | 1.75 |

NOTE.—Catalyst activity decreasing with time.

Accordingly, operation at a nominal inlet pressure of 100 p.s.i.g. is recommended. This pressure is sufficiently low to prevent mixed phase operation and sufficiently high to permit an overall weight hourly space velocity (WHSV) of about 2.

While it was observed that increasing the hydrogen-to-hydrocarbon ratio appears to increase reaction rate by some complex diffusion mechanism, this ratio is not highly critical. Increasing the $H_2$/HC ratio from 6/1 to 25/1 increases the hydrogen partial pressure by less than about 10% and as previously indicated only extreme variations in reaction pressure affect the result. As a practical matter, a ratio of 6/1 to 25/1 should be used.

The weight hourly space velocity in the reactor is also not a particularly critical factor over practical limits. For example, a suitable weight hourly space velocity should be between about 0.5 and 2.5. It has been found that if the weight hourly space velocity is too high above 2, for example between 2 and 4, this factor begins to influence the conversion. Table VII illustrates the effect of varying the WHSV.

TABLE VII

| Test | WHSV | Pressure, p.s.i.g. | $H_2$/HC | Temp, °F. | Time, sec. | $K_1$, sec.$^{-1}$ | D | T | N |
|---|---|---|---|---|---|---|---|---|---|
| 1 | 2.4 | 70 | 11.8 | 440 | 1.59 | 1.26 | 0.4 | 84.3 | 13.4 |
| 2 | 3.0 | 70 | 13.3 | 440 | 1.27 | 1.34 | 0.4 | 79.8 | 18.2 |
| 3 | 1.8 | 70 | 13.0 | 440 | 2.12 | 1.19 | 0.7 | 89.6 | 8.1 |
| 4 | 1.2 | 70 | 13.2 | 440 | 3.17 | 0.99 | 1.5 | 91.9 | 4.0 |

The weight hourly space velocity through the guard case can be lower than through the reactors, for example between about 1.0 and 1.5.

Having described and illustrated the present invention by specific examples and comparisons and a specific flow diagram, it is to be understood that these are not to be considered limiting but the present invention is to be limited only in accordance with the appended claims.

We claim:

1. A method for producing tetrahydronaphthalene, comprising; reacting naphthalene and hydrogen in a plurality of serially-connected reaction zones containing a hydrogenation catalyst while maintaining hydrogenation conditions therein and while maintaining said naphthalene in the vapor phase, at least a first of said reaction zone being maintained under adiabatic conditions and below about 550° F. and at least the last of said reaction zones being maintained under isothermal conditions and below about 550° F.

2. A method in accordance with claim 1 wherein the reaction is carried out in the adiabatic reaction zones until at least about 50% of the naphthalene has been converted to tetrahydronaphthalene.

3. A method in accordance with claim 1 wherein at least the naphthalene is contacted with a particulate material comprising copper oxide on an inert, solid support prior to reacting said naphthalene with hydrogen.

4. A method in accordance with claim 3 wherein the hydrogenation catalyst is a sulfur-sensitive hydrogenation catalyst.

5. A method in accordance with claim 4 wherein the sulfur-sensitive hydrogenation catalyst is nickel oxide deposited on an inert, solid support.

6. A method in accordance with claim 1 wherein the hydrogenation catalyst is an oxide of a hydrogenation metal and said oxide is at least partially reduced prior to reacting the naphthalene with hydrogen.

7. A method in accordance with claim 1 wherein the hydrogenation conditions are sufficient to maintain substantially all of the reactants and products in the reaction zones in a vapor phase.

8. In a method of producing tetrahydronaphthalene by reacting naphthalene with hydrogen, the improvement comprising; passing at least said naphthalene through a body of a particulate material comprising copper oxide deposited on a solid, inert support and thereafter said hydrogen with said naphthalene in the presence of a sulfur-sensitive hydrogenation catalyst and under hydrogenation conditions.

9. A method in accordance with claim 8 wherein the reaction is conducted under adiabatic conditions until at least about 50% of the naphthalene is converted to tetrahydronaphthalene, and the conversion of said naphthalene to tetrahydronaphthalene is thereafter carried to substantial completion under isothermal conditions.

10. In a method of producing tetrahydronaphthalene by reacting a sulfur-containing naphthalene with hydrogen, the improvement comprising; passing at least said naphthalene through a body of a particulate material comprising copper oxide deposited on a solid, inert support and thereafter reacting said hydrogen with said naphthalene in the presence of a sulfur-sensitive hydrogenation catalyst in a plurality of serially connected reaction zones containing a hydrogenation catalyst while maintaining hydrogenation conditions therein and while maintaining said naphthalene in the vapor phase, at least a first of said reaction zones being maintained under adiabatic conditions and below about 550° F., and at least the last of said reaction zones being maintained under isothermal conditions and below about 550° F.

11. A method in accordance with claim 10 wherein the hydrogenation catalyst is nickel oxide deposited on a solid, inert support.

12. A method in accordance with claim 10 wherein the hydrogenation catalyst is an oxide of a hydrogenation metal and said oxide is at least partially reduced prior to reacting the naphthalene with hydrogen.

13. A method in accordance with claim 10 wherein the reaction is carried out in the adiabatic reaction zones until at least about 50% of the naphthalene has been converted to tetrahydronaphthalene.

(References on following page)

References Cited

UNITED STATES PATENTS

| | | | |
|---|---|---|---|
| 1,733,908 | 10/1929 | Schrauth | 260—667 |
| 3,428,697 | 2/1969 | Zulueta | 260—667 |
| 2,586,535 | 2/1952 | Ipatieff | 260—667 |
| 2,515,279 | 7/1950 | Von Der Hoeuen | 260—667 |
| 3,000,983 | 9/1961 | Sanford | 260—667 |
| 3,236,764 | 2/1966 | Deu Herder | 260—667 |
| 3,277,199 | 10/1966 | Poll | 260—667 |
| 3,387,049 | 6/1968 | Craig et al. | 260—667 |
| 3,400,167 | 9/1968 | Heuke et al. | 260—667 |
| 3,344,200 | 9/1967 | Wold | 260—667 |
| 2,481,921 | 9/1949 | Gwynn | 260—667 |
| 1,998,595 | 4/1935 | Speer | 260—667 |
| 3,227,768 | 1/1966 | Cole | 260—667 |

DELBERT E. GANTZ, Primary Examiner

V. O'KEEFE, Assistant Examiner

U.S. Cl. X.R.

208—56